*INVENTOR.*
KENNETH M. HOLLAND
BY
Townsend and Townsend
*ATTORNEYS*

July 31, 1956 K. M. HOLLAND 2,756,496
METHOD OF EXPANDING EXPANDABLE METAL FOIL HONEYCOMB
Filed Oct. 21, 1952 3 Sheets-Sheet 2
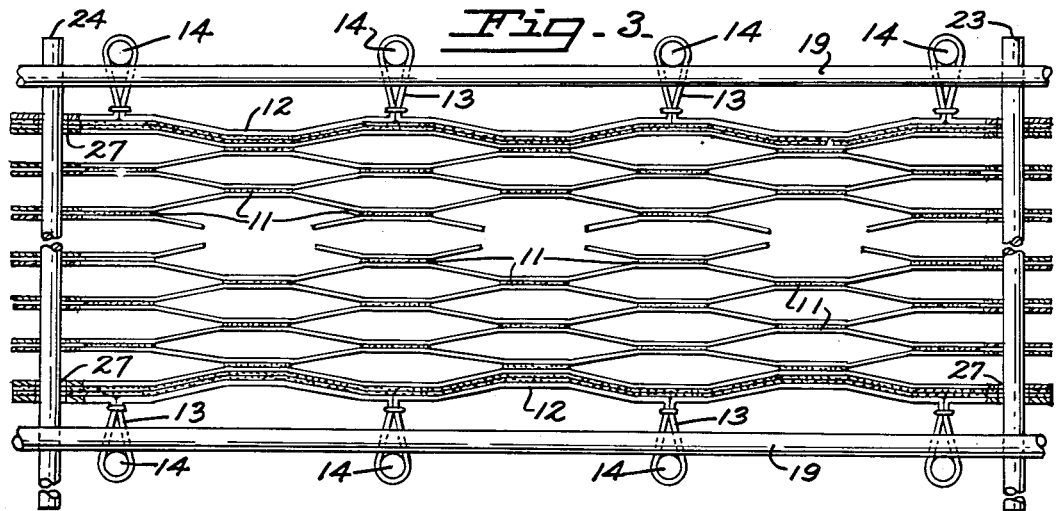
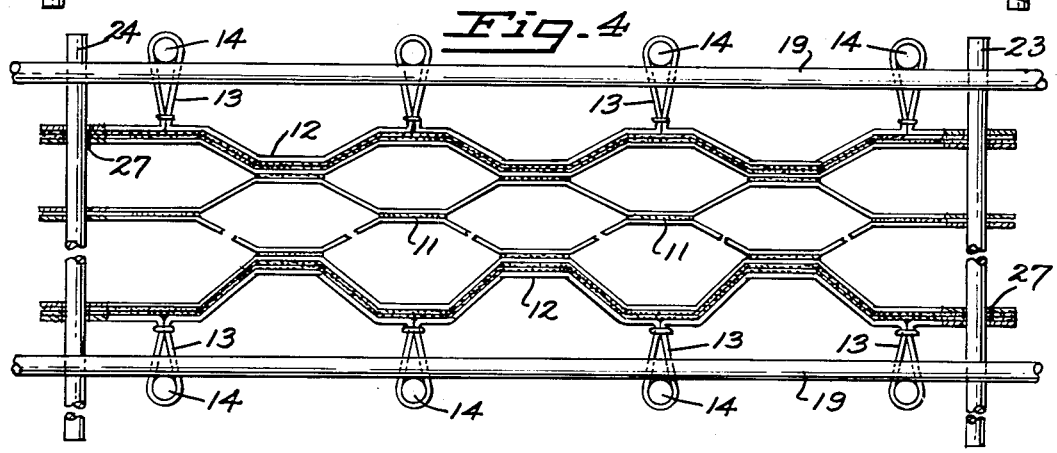
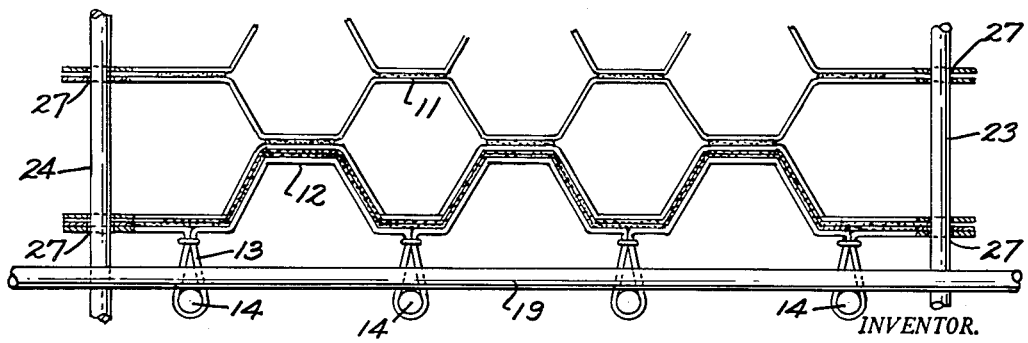
INVENTOR.
KENNETH M. HOLLAND
BY
Townsend and Townsend
ATTORNEYS July 31, 1956 K. M. HOLLAND 2,756,496
METHOD OF EXPANDING EXPANDABLE METAL FOIL HONEYCOMB
Filed Oct. 21, 1952 3 Sheets-Sheet 3

INVENTOR.
KENNETH M. HOLLAND
BY
Townsend and Townsend
ATTORNEYS

United States Patent Office 2,756,496
Patented July 31, 1956

2,756,496

METHOD OF EXPANDING EXPANDABLE METAL FOIL HONEYCOMB

Kenneth M. Holland, Albany, Calif., assignor to Hexcel Products Inc., a corporation of California Application October 21, 1952, Serial No. 315,957

5 Claims. (Cl. 29—455)

This invention relates to a new and improved method of expanding an unexpanded metal foil honeycomb.

In copending application Serial No. 200,352, now Patent No. 2,674,295, filed December 13, 1950, there is disclosed a method of and means for expanding unexpanded blocks of expandable cellular material such as honeycomb. The invention disclosed in said application, briefly stated, embraces the conception of applying pursable anchor strips, as by adhesive, to opposite ends of an unexpanded block of honeycomb and then applying expansion forces to the strips at a plurality of spaced points throughout the lengths of the strips to cause the block to expand while simultaneously permitting it to purse inwardly and narrow in the direction of its width.

A characteristic of honeycomb is that as it is expanded lengthwise in a direction substantially normal to its bonding lines, the individual webs of material making up the honeycomb will purse inwardly laterally to cause general narrowing of the honeycomb block throughout its length. The more the honeycomb is expanded, the greater will be the narrowing of the block. However, in expanding a block of metal foil honeycomb, unevenness in expansion may occur in either one or both of two principal ways. Firstly, it frequently happens that during expansion of a block of metal foil, the side edges thereof will tend to bow or wave inwardly or outwardly out of parallelism with one another and with respect to the medial lengthwise axis of the block. This in turn will result in unevenness and non-uniformity of cell expansion of the block. With relatively light gauge metal foil unevenly expanded areas of an expanded block can be manually shaped and formed so as to straighten out the side edges in substantial parallelism with one another. However, such practices require skilled labor and considerable labor time to accomplish. Moreover, with respect to expanded blocks of honeycomb made of relatively heavy gauge metal foil, it is virtually a physical impossibility to manually manipulate and deform unevenly expanded areas of the block back to uniform shape and proportions.

It is a principal object of the present invention, therefore, to teach a method of maintaining the side edges of a metal foil block of honeycomb at all times during expansion thereof so as to prevent the side edges from bowing inwardly or outwardly, and which said method results in uniformity and evenness in the overall lengthwise narrowing of the block due to expansion. As will more fully hereinafter appear, a block of honeycomb expanded in accordance with the means and methods herein disclosed will have its side edges disposed in substantially parallel alignment at the conclusion of the expansion process and without requiring a substantial amount of manual or other manipulation of the expanded block to bring the side edges thereof into parallel alignment.

Another factor which frequently contributes to unevenness and non-uniformity of cell expansion is that in a given block of metal foil honeycomb there frequently exists slight variations in the density of the metal foil out of which the honeycomb is made. Even when the block has been made from a single roll or sheet of metal foil, certain areas of the block may be of slightly greater or lesser densities than other areas of the block. Because a greater expansion force is required to expand to nominal size the honeycomb cells located in areas of greater density than is required to expand to nominal size the cells located in areas of lesser density, it often happens that the areas of least density will tend to overexpand, while areas of greatest density will tend to underexpand, when expansion forces are exerted on opposite ends of the block as aforesaid.

In order to overcome this difficulty, I prefer to apply sufficient expansion forces to a block of honeycomb so as to overexpand all of the cells of the entire block and then to contract the block back to its condition of nominal cell expansion. In this way substantially complete, even, and uniform expansion of all of the cell areas of the block is assured.

Other objects and advantages of the present invention will become apparent upon reading the following specification and referring to the accompanying drawings in which similar characters of reference represent corresponding parts in each of the several views.

Figs. 3, 4, and 5 are fragmentary views disclosing a block of honeycomb in different stages of expansion according to the invention.

Figure 6:
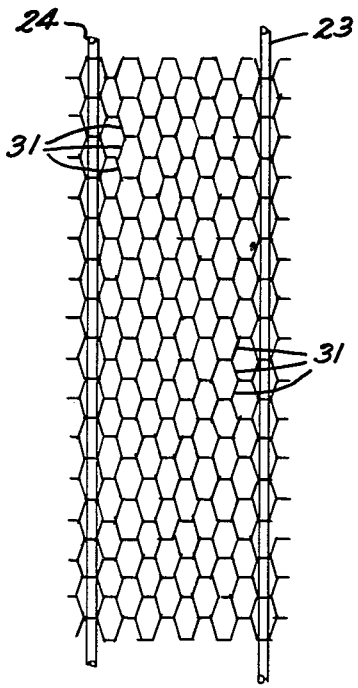

Fig. 6 discloses a block of honeycomb in overexpanded condition according to the invention.

Figure 7:
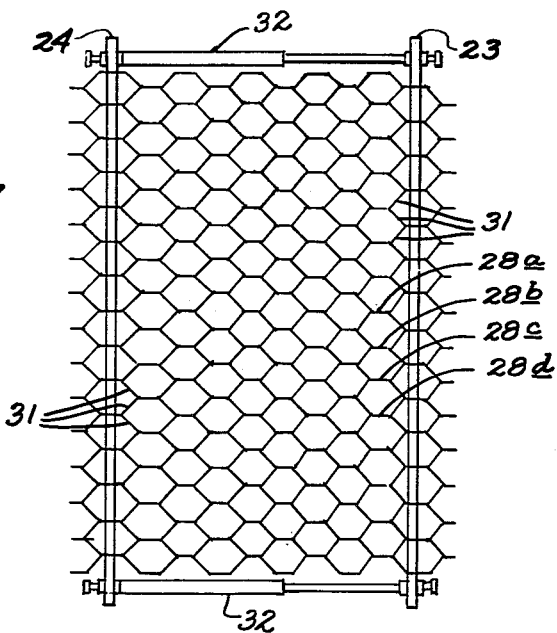

Fig. 7 discloses the block shown in Fig. 6 after the cells thereof have been contracted from overexpanded condition back to nominal cell expansion.

Figure 1:
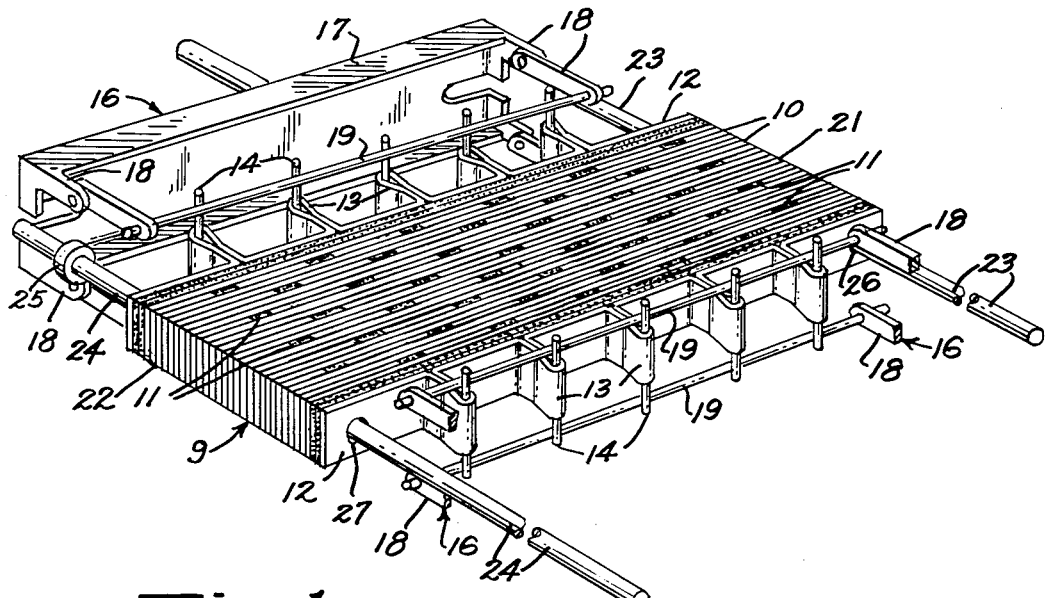
Fig. 1 is a perspective view of an unexpanded block of honeycomb shown in connection with a type of expanding equipment suitable for practicing the invention.
Figure 2:
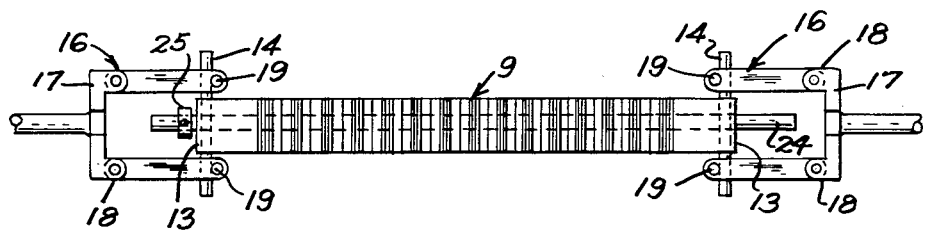
Fig. 2 is a side elevational view of the same.

Referring now more particularly to the drawings, Figs. 1 and 2 disclose an unexpanded block of metal foil honeycomb jigged within a type of equipment which may be employed for carrying out the invention. More specifically, the block of metal foil honeycomb, indicated generally at 9, comprises a plurality of individual strips or webs of metal foil 10 in which adjacent webs or strips are bonded to one another by alternately staggered bonding lines, as indicated at 11. It is noted that all of the bonding lines extend in a substantially common direction parallel with the transverse axis of the honeycomb block. In copending application Ser. No. 200,532, now Patent No. 2,674,295, it is disclosed how substantially uniform expansion forces may be applied to the block by means of pursable anchor strips, such as indicated at 12, each having a plurality of spaced loops 13 in which tug pins 14 are inserted. As described in said application, the pursable anchor strips may be adhesively secured to opposite end webs of the honeycomb block and pulling forces exerted on the strips via tug pins 14 and loops 13 by pull bars 16. Pull bars 16 may each comprise a base 17 and track supporting arms 18, which support a pair of parallel tracks 19. In the embodiment shown, trackways 19 slidably support tug pins 14 in such manner that as the pull bars are moved relatively away from one another causing the honeycomb to expand lengthwise with consequent narrowing of the block, said tug pins will be free to move slidably relatively toward one another along said trackways corresponding to the overall narrowing of the block caused by pursing of the individual webs of honeycomb as expansion progresses.

In order to guide and maintain the side edges 21 and 22 of the block in parallelism and to prevent their bowing inwardly or outwardly during expansion of said block, I employ guide elements, such as guide rods 23 and 24, which, in turn, are threaded through preformed associated parallel guide apertures 26 and 27 extending lengthwise through the block. More specifically, before expanding the block, parallel guide apertures, such as heretofore designated at 26 and 27, may be bored, drilled, or otherwise formed lengthwise through the block, preferably adjacent each side edge thereof and through each individual web comprising said block. These holes are preferably formed parallel with the side edges 21 and 22 of the block and are of large enough diameter to slidably accommodate associated guide rods 23 and 24, which are threaded or inserted through the apertures prior to expansion of the block. The guide rods, in turn, preferably have a length substantially greater than the nominal expanded length of the honeycomb block to be expanded.

In this connection the nominal cell size of expanded honeycomb is generally determined and designated by the distance between adjacent bonding lines measured in the direction of the lengthwise axis of the block. Thus, if it be assumed that the nominal cell size of the expanded block of honeycomb shown in Fig. 7, for example, is one-quarter inch, the distance between adjacent parallel bonding lines 28a, 28b, 28c, and 28d, for instance, should measure one-quarter inch. Generally speaking, all of the cells of a properly constructed and expanded block of honeycomb should be of substantially the same size and shape and the distance between adjacent parallel glue lines should equal the nominal cell dimension for that block, whatever it may be.

Figs. 3, 4, and 5 disclose fragmentarily a metal foil block of honeycomb in different stages of expansion in accordance with preferred practice of the invention. Fig. 3 shows fragmentarily the block after sufficient expansion forces have been applied to partially open the cells.

In this connection expansion forces may be applied through pursable anchor strips 12, tug pins 14, and pull bars 16. More particularly, the block may be laid and supported on a suitable table surface (not shown) and expanded lengthwise over said surface. One of the anchoring strips may be held manually or otherwise against movement while the other is pulled away from it with sufficient manually or mechanically applied force to cause the cells of the block to open up and expand. The guide rods inserted through the guide apertures are free to move laterally inwardly relatively toward one another corresponding to the pursable narrowing of the block as expansion progresses. Suitable removable collars 25 may be securely mounted by set screws or like means adjacent the ends of the rods to prevent any possibility of the rods moving endwise through the block and becoming displaced from within the apertures during expansion.

It will be observed from Fig. 3 that the apertured webs of metal foil making up the block will, during expansion, move slidably along guide rods 23 and 24. Fig. 4 shows the block in a further stage of expansion whereat the apertured honeycomb webs have moved further along the rods and at a distance spaced further apart from one another. This figure also discloses how, as expansion progresses, the guide rods will move inwardly laterally relatively toward one another corresponding to the general overall narrowing of the block.

Fig. 5 shows the block in further expanded condition whereat the honeycomb webs have moved still further apart along the rods; and the rods, in turn, have moved closer together. These figures also illustrate the fact that the guide rods during the expansion process will have maintained the side edges of the block in a substantially straight line and parallel path of movement, thereby preventing inward or outward bowing or curving of the side edges during expansion.

As heretofore mentioned, it has been found that in many instances more even and uniform expansion of all of the cell areas of a given honeycomb block can be accomplished by initially over-expanding all of the individual cells thereof beyond their nominal size, and then applying forces to the block so as to uniformly contract all cell areas back to nominal size.

In accomplishment of this end I exert sufficient expansion force on the pull bars 16 to expand the block to what might be termed its optimum expanded length. In honeycomb made of relatively light gauge metal foil (such as .002" gauge), the optimum length and degree of expansion will be reached when the unbonded side walls of the cells extend substantially perpendicular to the bonding lines. Thus, for example, the block of honeycomb illustrated in Fig. 6 is shown as having been expanded to a point whereat side walls 31 extend very nearly parallel to the lengthwise axis of the block and almost perpendicular to the direction in which glue lines 11 extend. In heavier gauge metal foil honeycomb (such as .004" gauge) it is almost a practical impossibility to overexpand the cells to a point where the unbonded side walls thereof extend nearly perpendicular to the bonding lines without likelihood of rupturing the bonding lines. On the other hand, it is possible to very markedly overexpand the cells of heavier gauge metal foil honeycomb to a point well beyond the nominal cell size of the block.

It has heretofore been mentioned how expansion of honeycomb in the direction of its length will cause pursing of the webs of honeycomb and a consequent overall narrowing of the block in the direction of its width. The converse situation is also true in that when forces are applied to a honeycomb block in the direction of its width to forcefully cause the widening of said block, a consequent shortening in its length will occur. Thus, in the preferred practice of the present method, after the honeycomb block has been expanded beyond its nominal cell size as above explained and as illustrated in Fig. 6, the said block is contracted back to its nominal cell size by forcefully pulling the guide rods 23 and 24 apart from one another—thereby causing a widening of the block in the direction of its width, a shortening of the block in the direction of its length, and a decrease in nominal cell size as determined by the measured distance between parallel adjacent bonding lines 28a, 28b, 28c, 28d, etc., as aforesaid. In short, after the block has been overexpanded in the direction of its length by applying lengthwise expansion forces through the pursable strips or equivalent means, the said block is then forcefully contracted back to nominal cell size by applying lateral forces to the guide rods. It has been found that contraction of the honeycomb block from its overexpanded condition to nominal cell size will result in extreme evenness and uniformity in cell expansion.

Another valuable advantage which is attainable by the use of guide elements such as rods 23 and 24, is that after expansion of the block said rods afford an excellent means of holding it against either further expansion or contraction during subsequent processing operations which may be performed relative to the block, as, for example, during lay-up work, or in applying face sheets to the material, or in contouring or shaping the face surface defining cell edges of the block after expansion as by grinding or cutting the metal foil material.

In this respect, Fig. 7 discloses how the guide rods may be adjustably locked together in proper spaced relationship from one another as by suitable clamping bars, indicated at 32. In effect, the rods in conjunction with the clamping bars serve as a holding jig for the expanded block to prevent its expansion or contraction, or other deformation of the cells, during fabricating operations which may be performed with respect to said block.

It is readily understandable that the guide rods 23 and 24 may be readily withdrawn from their associated guide apertures 26 and 27 at any time and either before or after face sheets (not shown) have been bonded to opposite faces of the cellular core material in accordance with customary practices. Thereupon the outer marginal side edges in which the guide apertures 26 and 27 have been formed can be trimmed off as waste material by means of a band saw or like instrument, if desired.

Although the present invention has been described in some detail by way of illustration and example for purposes of clarity of understanding, it is understood that certain changes and modifications may be made within the spirit of the invention as limited only by the scope of the claims appended hereto.

I claim:

1. A method of expanding a block of unexpanded metal foil honeycomb of the type having its individual webs and bonding lines extending in a substantially common direction with the ends of the webs defining the side edges of the block and said block being further characterized by its ability to be expanded in the direction of its length normal to said webs and bonding lines with resultant tendency of said webs to purse inwardly laterally to cause a general narrowing of said block throughout its length, the steps comprising: expanding said block of honeycomb in the direction of its length and simultaneously guiding opposite ends of all of the honeycomb webs defining opposite side edges of the block in substantially parallel straightline paths of movement in the direction of lengthwise expansion of the block so as to prevent the end webs defining the sides of the block from substantially bowing inwardly or outwardly relative to one another and relative to the lengthwise axis of said block.

2. A method of expanding an unexpanded block of honeycomb of the type having its cell bonding lines extending in a substantially common direction and further characterized by its ability to be expanded lengthwise in a direction substantially normal to said bonding lines with resultant tendency of the individual webs of honeycomb material to purse inwardly laterally to cause a general narrowing of the block throughout its length comprising the steps of: forming a guide cut-out lengthwise through said unexpanded block and through each individual web thereof, slidably positioning in said guide cut-out a relatively rigid guide element having a length at least as great as the nominal expanded length of said block to be expanded, and then expanding said block to cause opening up of the individual cells thereof while maintaining said guide element within said cut-out.

3. A method of expanding an unexpanded block of honeycomb of the type having its cell bonding lines extending in a substantially common direction and further characterized by its ability to be expanded lengthwise in a direction substantially normal to said bonding lines with resultant tendency of the individual webs of honeycomb material to purse inwardly laterally to cause a general narrowing of the block throughout its length, comprising the steps of: forming first and second parallel guide cut-outs, each extending lengthwise through the unexpanded block and through each individual web thereof adjacent first and second edges of said block; slidably positioning within each said guide cut-out a relatively rigid guide element having a length at least as great as the nominal expanded length of the honeycomb block to be expanded; and then expanding said block of material while maintaining said guide elements within said guide cut-outs in such way as to enable said guide elements to move relatively toward one another simultaneously with and corresponding to the narrowing of the block during expansion thereof.

4. A method of expanding an unexpanded block of honeycomb of the type having its cell bonding lines extending in a substantially common direction and further characterized by its ability to be expanded lengthwise in a direction substantially normal to said bonding lines with resultant tendency of the individual webs of honeycomb material to purse inwardly laterally to cause a general narrowing of the block throughout its length comprising the steps of: forming first and second parallel guide cut-outs, each extending lengthwise through the unexpanded block and through each individual web thereof adjacent first and second edges of said block; slidably positioning within each said guide cut-out a relatively rigid guide element having a length at least as great as the nominal expanded length of the honeycomb block to be expanded; then overexpanding said block in the direction of its length sufficient to cause all cells of said block to open up substantially beyond their nominal expanded size while maintaining said guide elements within said guide cut-outs and in such way as to enable said guide elements to move relatively toward one another simultaneously with and corresponding to the narrowing of the block in the direction of its width during expansion thereof, and then forcefully moving said guide elements in a direction away from one another sufficient to cause widening of the block in the direction of its width and shortening of the block in the direction of its length so as to cause all cell openings of said block to return to nominal expanded size.

5. In the art of maintaining an expanded sheet of metal foil honeycomb in its expanded shape during fabrication thereof comprising: forming a first row of aligned apertures extending lengthwise of said block through each individual web thereof adjacent a first side edge of said block, and forming a second row of aligned apertures parallel to said first row extending lengthwise of said block and through each individual web thereof adjacent to a second side edge of said block, inserting first and second stiffening members through said first and second rows of aligned apertures, and anchoring said first and second stiffening members against relative movement toward or away from one another.

References Cited in the file of this patent

UNITED STATES PATENTS

| | | |
|---|---|---|
| 1,649,809 | Campbell | Nov. 22, 1927 |
| 1,851,782 | Sugiura | Mar. 29, 1932 |
| 2,018,085 | Otto | Oct. 22, 1935 |
| 2,114,592 | Cross | Apr. 19, 1938 |
| 2,181,897 | Kapp | Dec. 5, 1939 |
| 2,212,481 | Sendzimir | Aug. 20, 1940 |
| 2,314,978 | Gunn | Mar. 30, 1943 |
| 2,333,343 | Sendzimir | Nov. 2, 1943 |
| 2,441,858 | Watter | May 18, 1948 |